(12) United States Patent
Plummer et al.

(10) Patent No.: US 9,353,878 B2
(45) Date of Patent: May 31, 2016

(54) DUAL PLATE BACKFLOW AND BREAKAWAY CHECK VALVE

(71) Applicants: Melvin Plummer, Los Angeles, CA (US); Aaron Plummer, Los Angeles, CA (US); Jerry Friedman, Los Angeles, CA (US); Uri Shohet, Los Angeles, CA (US)

(72) Inventors: Melvin Plummer, Los Angeles, CA (US); Aaron Plummer, Los Angeles, CA (US); Jerry Friedman, Los Angeles, CA (US); Uri Shohet, Los Angeles, CA (US)

(*) Notice: Subject to any disclaimer, the term of this patent is extended or adjusted under 35 U.S.C. 154(b) by 0 days.

(21) Appl. No.: 14/634,082

(22) Filed: Feb. 27, 2015

(65) Prior Publication Data

US 2015/0240962 A1 Aug. 27, 2015

Related U.S. Application Data

(60) Provisional application No. 61/945,617, filed on Feb. 27, 2014.

(51) Int. Cl.
| | |
|---|---|
| *F16K 17/40* | (2006.01) |
| *E03B 9/04* | (2006.01) |
| *F16K 17/34* | (2006.01) |
| *F16K 17/36* | (2006.01) |
| *A62C 35/20* | (2006.01) |
| *A62C 35/68* | (2006.01) |
| *E03B 9/02* | (2006.01) |

(52) U.S. Cl.
CPC ............ *F16K 17/34* (2013.01); *A62C 35/20* (2013.01); *A62C 35/68* (2013.01); *E03B 9/02* (2013.01); *E03B 9/04* (2013.01); *F16K 17/36* (2013.01); *F16K 17/40* (2013.01); *Y10T 137/5491* (2015.04); *Y10T 137/88054* (2015.04)

(58) Field of Classification Search
CPC ........ A62C 35/20; A62C 35/68; F16K 17/34; F16K 17/36; F16K 17/40; E03B 9/06; E03B 9/04
USPC .......................................... 137/272, 299, 300
See application file for complete search history.

(56) References Cited

U.S. PATENT DOCUMENTS

| | | | | |
|---|---|---|---|---|
| 6,401,745 | B1 * | 6/2002 | Corder | E03B 9/16 137/300 |
| 7,156,119 | B2 * | 1/2007 | Freudendahl | F16K 15/026 137/300 |
| 8,991,415 | B1 * | 3/2015 | Luppino | E03B 9/04 137/272 |
| 8,997,777 | B2 * | 4/2015 | Montague | A62C 35/20 137/281 |

\* cited by examiner

*Primary Examiner* — Kevin Lee (57) ABSTRACT

A dual plate backflow and breakaway check valve that features a warning system to alert individuals when fire hydrants are dislocated. The dual plate check valve comprises an upper surge protection valve assembly and a lower backflow protection valve assembly. When fire hydrant or pipes conveying fluids are damaged, the locking mechanism enables a plurality of upper witness stream holes to generate at least one plume of fluid to indicate and readily visualize location of damage and allows an upper barrel assembly to operate in a closure mode. In this mode, a high pressure spray of fluid emits from the upper valve barrel and an optimum inclination of the lower portion of the upper valve barrel enables the upper witness stream holes to collide with an inner side wall of the upper valve barrel which causes the plurality of upper witness stream holes to disperse into a warning signaling mist.

17 Claims, 5 Drawing Sheets

DUAL PLATE BACKFLOW AND BREAKAWAY CHECK VALVE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

The present embodiment relates generally to check valves, and more particularly, to a dual plate check valve having a fast locking mechanism that provides instant water shut off facility thereby minimizing possible loss of life and injuries during a fire hydrant dislocation and features an emergency warning system to alert individuals when pipes or fire hydrants are dislocated.

DISCUSSION OF RELATED ART

A wide variety of fire hydrants have been developed in the art. Usually, the fire hydrants are connected to a pressurized municipal water supply to provide water at the surface in case of an emergency. Since the fire hydrants are installed on road sides, automobiles strike the fire hydrants and in some instances the fire hydrants are dislocated. Natural disasters also cause damages to the fire hydrants. When the fire hydrant gets damaged, its connection to the main water line will be lost which in turn causes an uncontrollable flow of several thousand gallons of water from each sheared fire hydrant.

There have been many prior art improvements to dual plate check valves. One such method describes a check valve assembly mounted for engagement with a valve seat. The check valve assembly includes a flapper valve and a lever arm. The flapper valve includes a bracket which is pivotably mounted along a first hemisphere of the valve seat, a valve plate mounted to the bracket and a mounting assembly adjustably joining the valve plate to the bracket. The flapper valve has a closed position with the valve plate which is in sealing engagement with the valve seat. However, this check valve assembly includes a pin having one or more fastening means requiring additional structural and sealing components. Therefore, this type of check valve assembly requires expensive replacement and field servicing techniques.

Another method describes a wet barrel hydrant check valve having a body containing a dash-pot assembly connected to a flapper valve. The wet barrel hydrant check valve is spring biased towards the closed condition. A sandwich flange fixed to the hydrant has a member holding the flapper out of the flow passageway. However, this wet barrel hydrant check valve includes more components subject to erosion and wear. Further, such spring biased construction requires the flapper spring to be numerous, complex and expensive.

Yet another prior art method describes a check valve for a fire hydrant system configured to allow fluid to flow in a direction from a pressurized water supply to a fire hydrant and to restrict fluid flowing from the fire hydrant to the pressurized water supply. The check valve includes an internal cavity and a flapper capable of moving between an open position. Even so, this check valve includes structures which extend into the water flow path that interrupts water flow through the system.

In light of the foregoing discussion, there is a need for a dual plate check valve that would be simple, cost effective and require less maintenance. This needed device would provide an efficient fast-locking mechanism which minimizes water hammer and friction loss which occurs when any damage happens to the fire hydrant. Further, this device would also contain a fluid back flow prevention valve which becomes functional in its static mode as well as when the device is in an active mode. This needed device would possess components which are resistive to erosion and wear. Further, this device would provide instant water shut-off and would minimize possible loss of life and injuries caused by the fire hydrant destruction. The device would be easy to install under new fire hydrants and can be reinstalled or replaced under an existing fire hydrant and/or pipelines. Finally, this needed device would have low maintenance cost. The present embodiment accomplishes these objectives.

SUMMARY OF THE DISCLOSURE

The present invention is a dual plate backflow and breakaway check valve having a locking mechanism that provides instant water shut off facility and features an emergency warning system to alert individuals when pipes or fire hydrants are damaged. The dual plate backflow and breakaway check valve comprises an upper surge protection valve assembly and a lower backflow protection valve assembly. The upper surge protection valve assembly comprises an upper barrel assembly. The upper barrel assembly includes an upper valve barrel having a plurality of upper barrel holes, a surge valve clamp and a surge valve bar. A lower portion of the upper valve barrel is flared at an optimum inclination to reduce fluid flow restriction.

The upper barrel assembly further includes a top mounting flange, an upper plate assembly, a surge protection valve cap and an upper spring assembly. The top mounting flange is attached to an upper portion of the upper valve barrel. The top mounting flange includes a neoprene O-ring seal, a plurality of top flange holes arranged at the circumference of the top mounting flange, a clamp notch and a plurality of breakaway bolts. The plurality of top flange holes is designed to connect with a plurality of matching holes of the fire hydrant which firmly connects the dual plate check valve with the fire hydrant. The clamp notch holds the surge valve clamp in place when the fire hydrant is installed on the top mounting flange.

The upper plate assembly includes a first upper front plate, a second upper front plate, a first upper back plate, a second upper back plate and an upper neoprene gasket having a plurality of upper witness stream holes. The first upper front plate and the first upper back plate are connected together utilizing a plurality of fastening means to define a first upper plate arrangement. Similarly, the second upper front plate and the second upper back plate are connected together utilizing the plurality of fastening means to define a second upper plate arrangement. The first upper plate arrangement is connected with the upper neoprene gasket utilizing the plurality of fastening means and a first valve clamp limit bar. Similarly, the second upper plate arrangement is connected with the upper neoprene gasket utilizing the plurality of fastening means and a second valve clamp limit bar. The upper plate assembly is positioned inside the upper valve barrel. The attachment of the first and second upper plate arrangements to the upper neoprene gasket defines a valve locking mechanism.

The surge protection valve cap includes a plurality of surge valve cap holes. The upper spring assembly includes an upper spring member having a surge valve pin, a surge retainer bar with a plurality of upper retaining ends and an upper limit bar.

The upper spring member is connected with the surge retainer bar by inserting the surge valve pin through the plurality of upper retaining ends. In the preferred embodiment, the upper spring assembly is connected with the upper neoprene gasket and the surge protection valve cap. The upper spring assembly is positioned inside the upper valve barrel.

When a breakage of fire hydrant occurs, the valve locking mechanism enables the plurality of upper witness stream holes to generate at least one plume of fluid to indicate and readily visualize location of damage and allows the upper barrel assembly to operate in a closure mode. In the closure mode, a high pressure spray of fluid emits from the upper valve barrel and the optimum inclination of the lower portion of the upper valve barrel enables the plurality of upper witness stream holes to collide with an inner side wall of the upper valve barrel which causes the plurality of upper witness stream holes to disperse into a warning signaling mist. This warning signaling mist alerts individual that the fire hydrant has been damaged and an emergency repair is needed to the fire hydrant. In the preferred embodiment, the optimum inclination is 30 degree.

The lower backflow protection valve assembly comprises a lower plate assembly, a backflow protection valve cap and a lower spring assembly. The lower plate assembly includes a first lower front plate, a second lower front plate, a first lower back plate, a second lower back plate and a lower neoprene gasket having a plurality of lower witness stream holes. The first lower front plate and the first lower back plate are connected together utilizing the plurality of fastening means to define a first backflow lower plate arrangement. Similarly, the second lower front plate and the second lower back plate are connected together utilizing the plurality of fastening means to define a second backflow lower plate arrangement. The first backflow lower plate arrangement and the second backflow lower plate arrangement are attached to the lower neoprene gasket. The lower plate assembly is positioned inside the lower valve barrel. The backflow protection valve cap includes a plurality of backflow valve cap holes.

The lower spring assembly includes a lower spring member with a backflow valve pin, a backflow retainer bar with a plurality of lower retaining ends. The lower spring assembly further includes a lower limit bar inserted into at least one of a plurality of lower limit holes utilizing a plurality of lower limit bar securing mean. The lower spring member is connected with the backflow retainer bar by inserting the backflow valve pin through the plurality of lower retaining ends. In the preferred embodiment, the lower spring assembly is connected with the lower neoprene gasket and the backflow protection valve cap. The lower spring assembly is positioned inside the lower valve barrel. The lower spring assembly prevents backflow of fluid and possible fluid contamination.

When the fire hydrant gets damaged, the plurality of breakaway bolts breaks which dismounts the surge valve clamp and the surge valve bar from the upper surge protection valve assembly thereby allowing the first upper front plate, the second upper front plate, the first upper back plate and the second upper back plate to rotate about the surge valve pin and closes the upper barrel assembly against the inner side wall of the upper valve barrel at the optimum inclination and disperses the plurality of upper witness stream holes into the warning signaling mist. The valve locking mechanism provides instant water shut off facility thereby minimizing possible loss of life and injuries during a fire hydrant destruction.

An object of the present invention is to provide a fast-locking mechanism to prevent large amounts of water or fluid loss when fire hydrants and/or pipelines are damaged and/or broken.

A further object of the present invention is to provide a breakaway pipe coupling which automatically stops or terminates flow at the point of the breakage, upon damage to the pipelines and/or fire hydrant.

Another object of the invention is that the dual plate check valve is simple, cost effective and functions over a long period of time without any maintenance.

Yet another object of the present invention is to provide an emergency warning system to alert individuals when the fire hydrants and/or pipelines are damaged.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1A:
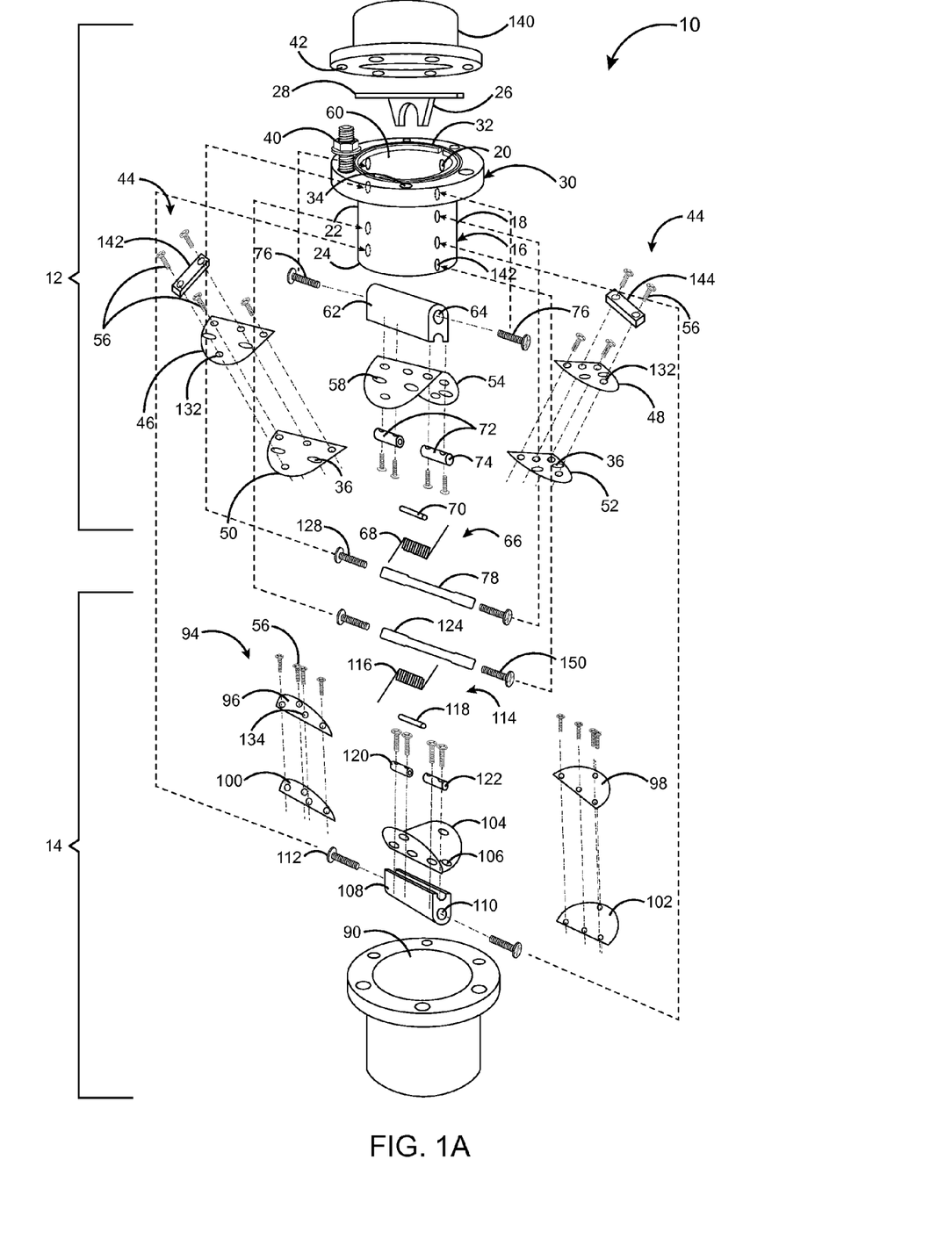
FIG. 1A is an exploded view of a preferred embodiment of a dual plate backflow and breakaway check valve in accordance with the present invention.

Referring to FIGS. 1A-4 of the drawings, a preferred embodiment of a dual plate backflow and breakaway check valve according to the present invention is illustrated in different views and generally designated by the reference numeral 10. FIG. 1A illustrates an exploded view of the dual plate backflow and breakaway check valve 10 having a locking mechanism that provides instant water shut off facility and features an emergency warning system to alert individuals when pipes or fire hydrants are dislocated. The dual plate backflow and breakaway check valve 10 comprises an upper surge protection valve assembly 12 and a lower backflow protection valve assembly 14. The upper surge protection valve assembly 12 comprises an upper barrel assembly 16. The upper barrel assembly 16 includes an upper valve barrel 18 having a plurality of upper barrel holes 20, a surge valve clamp 26 and a surge valve bar 28. A lower portion 24 of the upper valve barrel 18 is flared at an optimum inclination to reduce fluid flow restriction. In the preferred embodiment, the optimum inclination is 30 degree.

Figure 1B:
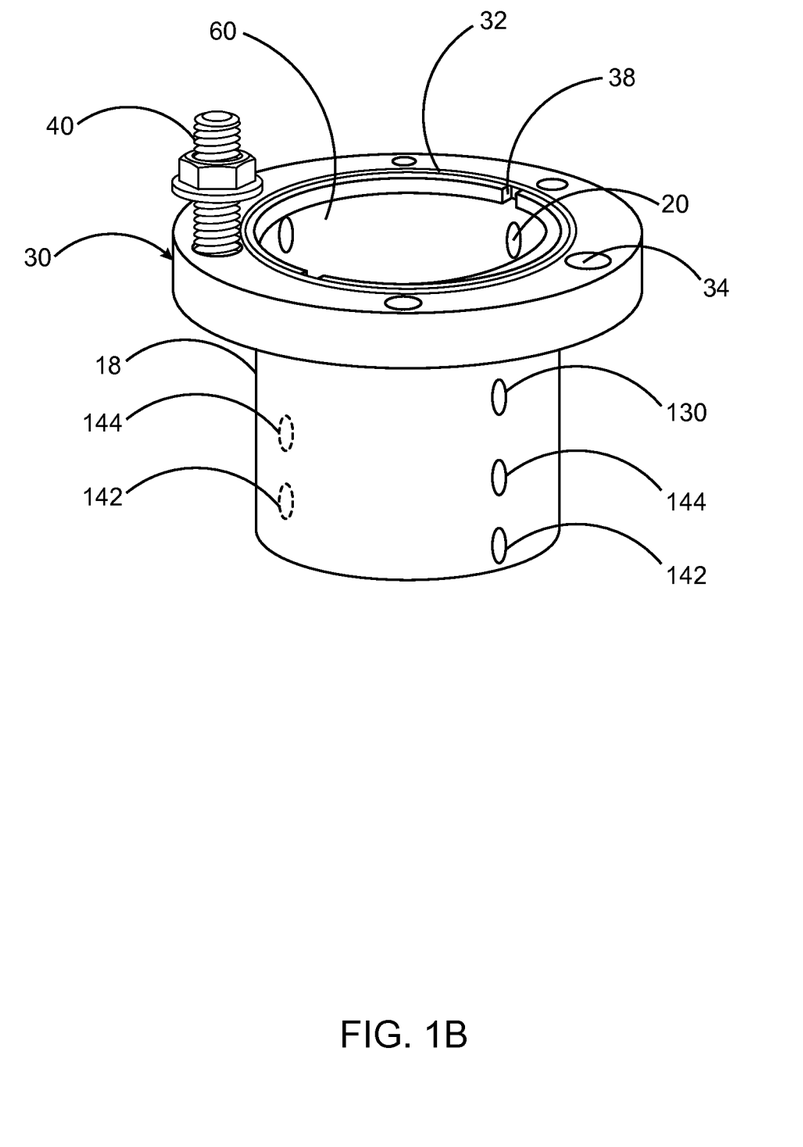
FIG. 1B is a perspective view of a preferred embodiment of the dual plate backflow and breakaway check valve in accordance with the present invention, illustrating an upper valve barrel.

The upper barrel assembly 16 further includes a top mounting flange 30, an upper plate assembly 44, a surge protection valve cap 62 and an upper spring assembly 66. The top mounting flange 30 is attached to an upper portion 22 of the upper valve barrel 18. FIG. 1B illustrates the upper valve barrel 18. Referring to FIGS. 1A and 1B, the top mounting flange 30 includes a neoprene O-ring seal 32, a plurality of top flange holes 34 arranged at the circumference of the top mounting flange 30, a clamp notch 38 (FIG. 1B) and a plurality of breakaway bolts 40. The clamp notch 38 is a slot positioned at an inner side wall 60 of the top mounting flange 30 to securely fit the surge valve bar 28 in place when the fire hydrant 140 is installed on the top mounting flange 30. The plurality of top flange holes 34 is designed to connect with a plurality of matching holes 42 of the fire hydrant 140.

The upper plate assembly 44 includes a first upper front plate 46, a second upper front plate 48, a first upper back plate 50, a second upper back plate 52 and an upper neoprene gasket 54 having a plurality of upper witness stream holes 58. The first upper front plate 46 and the first upper back plate 50 are connected together utilizing a plurality of fastening means 56 to define a first upper plate arrangement. The plurality of fastening means 56 is inserted through a plurality of upper plate holes 132. Similarly, the second upper front plate 48 and the second upper back plate 52 are connected together utilizing the plurality of fastening means 56 to define a second upper plate arrangement. The first upper plate arrangement is connected with the upper neoprene gasket 54 utilizing the plurality of fastening means 56 and a first valve clamp limit bar 142. Similarly, the second upper plate arrangement is connected with the upper neoprene gasket 54 utilizing the plurality of fastening means 56 and a second valve clamp limit bar 144. The upper plate assembly 44 is positioned inside the upper valve barrel 18. The attachment of the first and second upper plate arrangements to the upper neoprene gasket 54 defines the valve locking mechanism.

The surge protection valve cap 62 includes a plurality of surge valve cap holes 64. The upper spring assembly 66 includes an upper spring member 68 having a surge valve pin 70, a surge retainer bar 72 with a plurality of upper retaining ends 74 and an upper limit bar 78. The upper limit bar 78 is inserted into at least one of a plurality of upper limit bar holes 130 (FIG. 1B) of the upper valve barrel 18 utilizing a plurality of upper limit bar securing means 128. The upper spring member 68 is connected with the surge retainer bar 72 by inserting the surge valve pin 70 through the plurality of upper retaining ends 74. In the preferred embodiment, the upper spring assembly 66 is connected with the upper neoprene gasket 54 and the surge protection valve cap 62 by inserting and tightening each of the plurality of the fastening means 56 through at least one of the plurality of witness stream holes 58 and at least one of the plurality of surge valve cap holes 64. Upon connecting the upper spring assembly 66 with the upper neoprene gasket 54 and the surge protection valve cap 62, the upper spring assembly 66 is positioned inside the upper valve barrel 18 by inserting and tightening each of the plurality of surge valve cap securing means 76 through at least one of the plurality of surge valve cap holes 64 and the at least one of the plurality of upper barrel holes 20.

When a breakage of fire hydrant 140 occurs, the valve locking mechanism enables the plurality of upper witness stream holes 58 to generate at least one plume of fluid to indicate and readily visualize location of damage and allows the upper barrel assembly 16 to operate in a closure mode. In the closure mode, a high pressure spray of fluid emits from the upper valve barrel 18 and the optimum inclination of the lower portion 24 of the upper valve barrel 18 enables the plurality of upper witness stream holes 58 to collide with the inner side wall 60 of the upper valve barrel 18 which causes the plurality of upper witness stream holes 58 to disperse into a warning signaling mist. This warning signaling mist alerts individuals that the fire hydrant 140 has been damaged and an emergency repair is needed to the fire hydrant 140.

The lower backflow protection valve assembly 14 comprises a lower plate assembly 94, a backflow protection valve cap 108 and a lower spring assembly 114. The lower plate assembly 94 includes a first lower front plate 96, a second lower front plate 98, a first lower back plate 100, a second lower back plate 102 and a lower neoprene gasket 104 having a plurality of lower gasket holes 106. The first lower front plate 96 and the first lower back plate 100 are connected together utilizing the plurality of fastening means 56 to define a first backflow lower plate arrangement. Similarly, the second lower front plate 98 and the second lower back plate 102 are connected together utilizing the plurality of fastening means 56 to define a second backflow lower plate arrangement. The plurality of fastening means 56 is inserted and tightened through a plurality of lower plate holes 134. The first backflow lower plate arrangement and the second backflow lower plate arrangement are attached to the lower neoprene gasket 104. The backflow protection valve cap 108 includes a plurality of backflow valve cap holes 110. As shown in FIG. 1A, the dual plate check valve 10 fits into a water main flange 90.

The lower spring assembly 114 includes a lower spring member 116 with a backflow valve pin 118, a backflow retainer bar 120 with a plurality of lower retaining ends 122. The lower spring assembly 114 further includes a lower limit bar 124 inserted into at least one of a plurality of lower limit bar holes 142 utilizing a plurality of lower limit bar securing means 150. The lower spring member 116 is connected with the backflow retainer bar 120 by inserting the backflow valve pin 118 through the plurality of lower retaining ends 122. In the preferred embodiment, the lower spring assembly 114 is connected with the lower neoprene gasket 104 and the backflow protection valve cap 108 by inserting and tightening each of the plurality of fastening means 56 through at least one of the plurality of lower witness stream holes 106 and at least one of the plurality of backflow valve cap holes 110. The lower spring assembly 114 is positioned inside the upper valve barrel 18 by inserting and tightening each of a plurality of backflow valve cap screws 112 through at least one of the plurality of backflow valve cap holes 110 and at least one of the plurality of lower barrel holes 130. The lower spring assembly 114 prevents backflow of fluid and possible fluid contamination. In one aspect of the invention, the first upper front plate 46, the second upper front plate 48, the first upper back plate 50, the second upper back plate 52 includes a plurality of weep holes 36 to accommodate for the witness streams.

Figure 2:
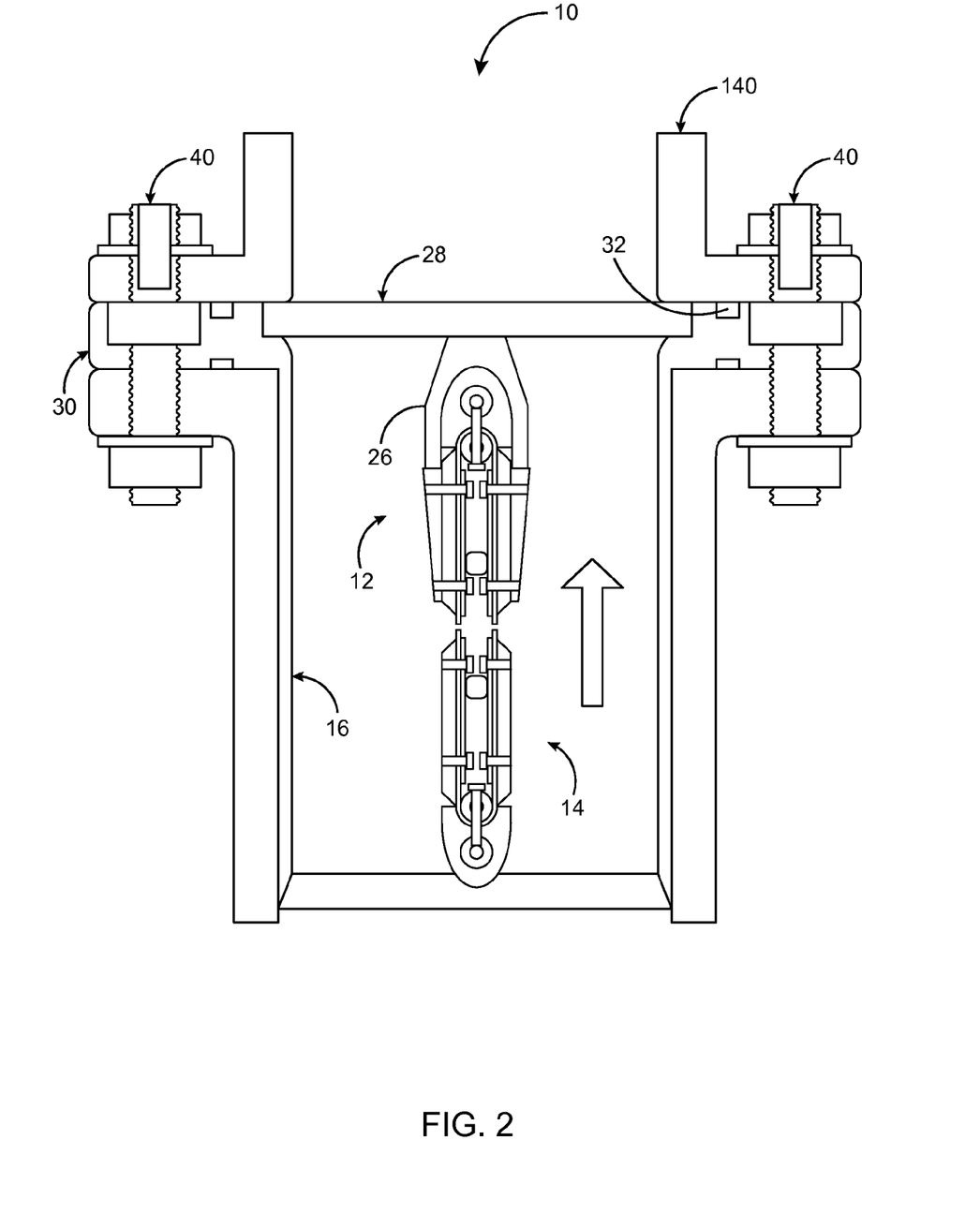
FIG. 2 is a side view of a preferred embodiment of an upper surge protection valve assembly in accordance with the present invention, illustrating an upper surge protection valve assembly and a lower backflow protection valve assembly positioned in a barrel assembly.

Referring to FIG. 2, when the fire hydrant 140 gets damaged, the plurality of breakaway bolts 40 breaks which dismounts the surge valve clamp 26 and the surge valve bar 28 from the upper surge protection valve assembly 12 thereby allowing the first upper front plate 46, the second upper front plate 48, the first upper back plate 50 and the second upper back plate 52 to rotate about the surge valve pin 70 and closes the upper barrel assembly 16 against the inner side wall 60 of the upper valve barrel 18 at the optimum inclination and disperses the plurality of upper witness stream holes 58 into the warning signaling mist. The valve locking mechanism provides instant water shut off facility thereby minimizing possible loss of life and injuries during a fire hydrant destruction. The exemplary design of the dual plate backflow and breakaway check valve 10 can be reset with minimal cost and time because when the device 10 get's damaged it is only required to replace the breakaway bolts 40 without replacing the entire components of the device 10. The direction of fluid flow is shown by arrow.

Figure 3:
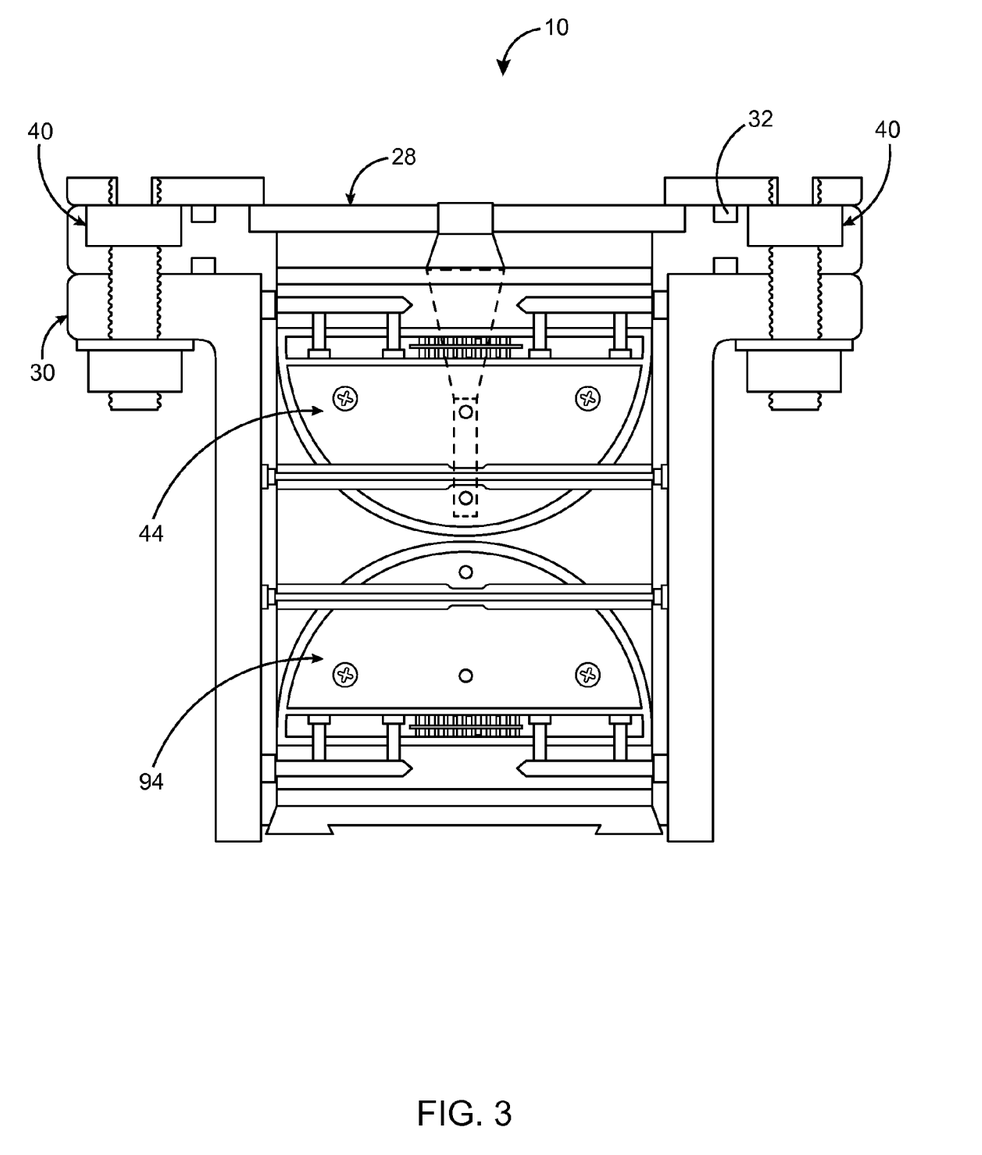
FIG. 3 is a front perspective view of a preferred embodiment of the dual plate backflow and breakaway check valve in accordance with the present invention, illustrating a plurality of plates in an upper plate assembly and in a lower plate assembly in a 90 degree inclination.
Figure 4:
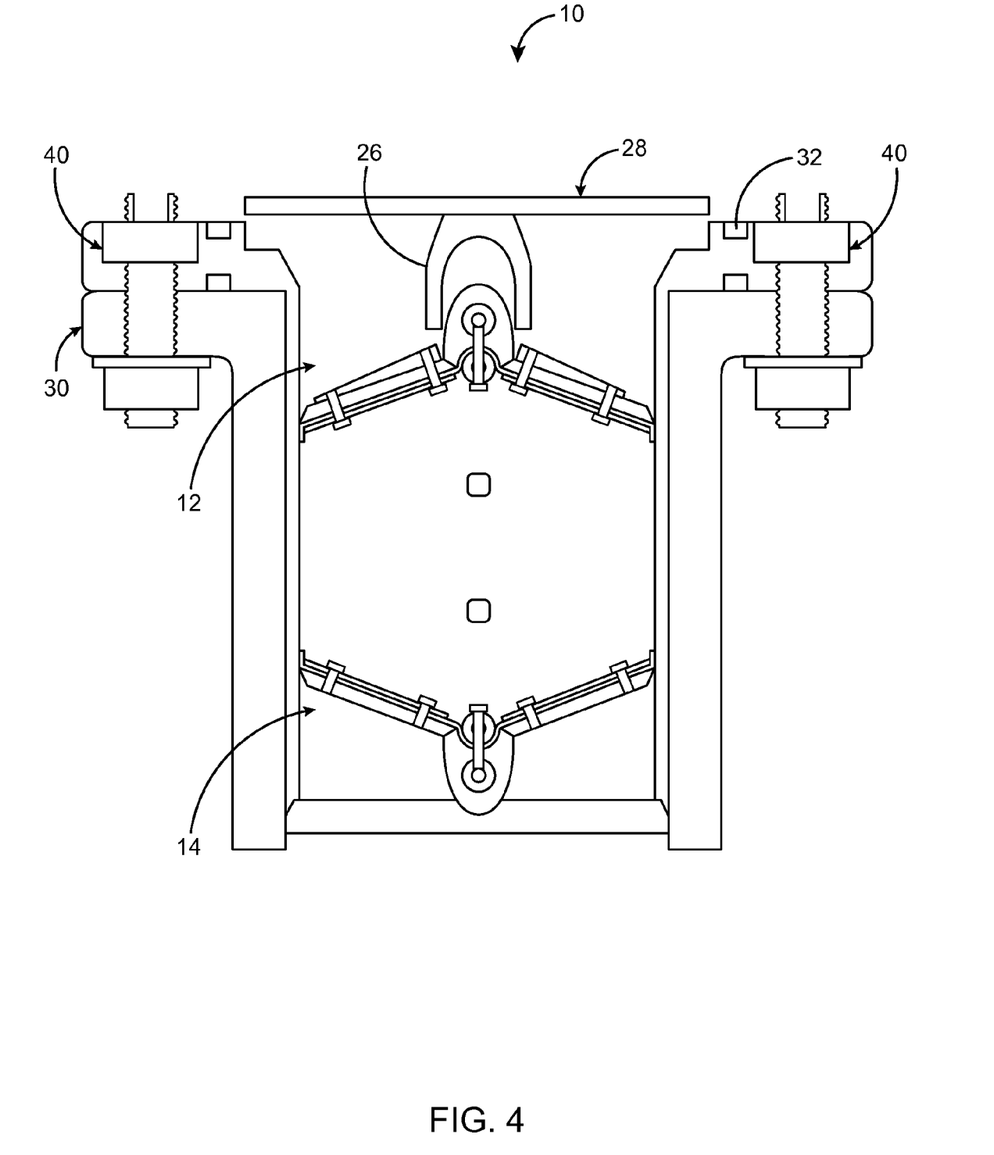
FIG. 4 is a side view of a preferred embodiment of the dual plate backflow and breakaway check valve in a fully deployed mode in accordance with the present invention.

FIG. 3 is a front perspective view of a preferred embodiment of the dual plate backflow and breakaway check valve 10, illustrating the plurality of plates in the upper plate assembly 44 and in the lower plate assembly 94 in a 90 degree inclination. FIG. 4 is a side view of a preferred embodiment of the dual plate backflow and breakaway check valve 10 shown in FIG. 2 in a fully deployed mode in accordance with the present invention. In the fully deployed mode the fluid flows in a minimal water/fluid loss.

While a particular form of the invention has been illustrated and described, it will be apparent that various modifications can be made without departing from the spirit and scope of the invention. For example, different valves in the preferred embodiment can be mounted in various configurations as separate assemblies or combined into one with and actuated by various break away methods. Accordingly, it is not intended that the invention be limited, except as by the appended claims.

What is claimed is:

1. A dual plate backflow and breakaway check valve comprising:
   an upper surge protection valve assembly comprising:
      an upper barrel assembly having an upper valve barrel with a plurality of upper barrel holes, an upper portion, a lower portion, a surge valve clamp and a surge valve bar, the lower portion being flared at an inclination to reduce fluid flow restriction;
      a top mounting flange attached to the upper portion of the upper valve barrel, the top mounting flange includes an O-ring seal, a plurality of top flange holes arranged at a circumference of the top mounting flange, a clamp notch and a plurality of breakaway bolts, the plurality of top flange holes being adapted to connect with a plurality of matching holes of a fire hydrant which connects the dual plate backflow and breakaway check valve with the fire hydrant, the clamp notch holds the surge valve clamp in place when the fire hydrant being installed on the top mounting flange;
         an upper plate assembly having a first upper front plate, a second upper front plate, a first upper back plate, a second upper back plate and an upper neoprene gasket having a plurality of upper witness stream holes, wherein the first upper front plate and the first upper back plate being connected together to define a first upper plate arrangement and the second upper front plate and the second upper back plate being connected together to define a second upper plate arrangement, the first upper plate arrangement and the second upper plate arrangement being attached to the upper neoprene gasket to define a valve locking mechanism, the upper plate assembly being positioned inside the upper barrel assembly, wherein when the fire hydrant gets damaged, the valve locking mechanism enables the plurality of upper witness stream holes to generate at least one plume of fluid to indicate location of damage and allows the upper barrel assembly to operate in a closure mode thereby generating a high pressure spray of fluid emitting from the upper valve barrel, whereby in the closure mode, the inclination of the lower portion of the upper valve barrel enables the plurality of upper witness stream holes to collide with an inner side wall of the upper valve barrel thereby dispersing the plurality of upper witness stream holes into a warning signaling mist;
   a surge protection valve cap having a plurality of surge valve cap holes; and
   an upper spring assembly having an upper spring member with a surge valve pin, a surge retainer bar with a plurality of upper retaining ends, an upper limit bar connected with the upper valve barrel by inserting and tightening a plurality of upper limit bar securing means through a plurality of lower limit bar holes, the upper spring member being connected with the surge retainer bar by inserting the surge valve pin through the plurality of upper retaining ends, the upper spring assembly being connected with the upper neoprene gasket and the surge protection valve cap, the upper spring assembly being positioned inside the upper valve barrel; and
a lower backflow protection valve assembly comprising:
   a lower plate assembly having a first lower front plate, a second lower front plate, a first lower back plate, a second lower back plate and a lower neoprene gasket having a plurality of lower witness stream holes, wherein the first lower front plate and the first lower back plate being connected together to define a first backflow lower plate arrangement and the second lower front plate and the second lower back plate being connected together to define a second backflow lower plate arrangement, the first backflow lower plate arrangement and the second backflow lower plate arrangement being attached to the lower neoprene gasket, the lower plate assembly being positioned inside the upper barrel assembly;
   a backflow protection valve cap having a plurality of backflow valve cap holes; and
   a lower spring assembly having a lower spring member with a backflow valve pin, a backflow retainer bar with a plurality of lower retaining ends and a lower limit bar connected with the upper valve barrel by inserting and tightening a plurality of lower limit bar securing means through a plurality of lower limit bar holes, the lower spring member being connected with the backflow retainer bar by inserting the backflow valve pin through the plurality of lower retaining ends, the lower spring assembly being connected with the lower neoprene gasket and the backflow protection valve cap, the lower spring assembly being positioned inside the upper valve barrel;

whereby when the fire hydrant gets damaged, the plurality of breakaway bolts breaks which causes the surge valve clamp and the surge valve bar to move away from the upper surge protection valve assembly thereby allowing the first upper front plate, the second upper front plate, the first upper back plate and the second upper back plate to rotate about the surge valve pin and closes the upper barrel assembly against the inner side wall of the upper valve barrel at the optimum inclination and disperses the plurality of upper witness stream holes into the warning signaling mist.

2. The dual plate backflow and breakaway check valve of claim 1 wherein the first upper front plate and the first upper back plate are connected together utilizing a plurality of fastening means.

3. The dual plate backflow and breakaway check valve of claim 1 wherein the second upper front plate and the second upper back plate are connected together utilizing a plurality of fastening means.

4. The dual plate backflow and breakaway check valve of claim 1 wherein the upper spring assembly is connected with the upper neoprene gasket and the surge protection valve cap by inserting and tightening each of a plurality of fastening means through at least one of the plurality of witness stream holes and at least one of the plurality of surge valve cap holes.

5. The dual plate backflow and breakaway check valve of claim 1 wherein the upper spring assembly is positioned inside the upper barrel assembly by inserting and tightening each of the plurality of surge valve cap securing means through at least one of the plurality of surge valve cap holes and at least one of the plurality of upper barrel holes.

6. The dual plate backflow and breakaway check valve of claim 1 wherein the first lower front plate and the first lower back plate are connected together utilizing a plurality of fastening means.

7. The dual plate backflow and breakaway check valve of claim 1 wherein the second lower front plate and the second lower back plate are connected together utilizing a plurality of fastening means.

8. The dual plate backflow and breakaway check valve of claim 1 wherein the lower spring assembly being connected with the lower neoprene gasket and the backflow protection valve cap by inserting and tightening a plurality of the fastening means through the plurality of witness stream holes and the plurality of backflow valve cap holes.

9. The dual plate backflow and breakaway check valve of claim 1 wherein the lower spring assembly is positioned inside the upper barrel assembly by inserting and tightening each of the plurality of backflow valve cap securing means through at least one of the plurality of backflow valve cap holes and at least one of a plurality of lower barrel holes.

10. The dual plate backflow and breakaway check valve of claim 1 wherein the lower spring assembly prevents backflow of fluid and possible fluid contamination.

11. A dual plate backflow and breakaway check valve comprising:
an upper surge protection valve assembly comprising:
an upper barrel assembly having an upper valve barrel with a plurality of upper barrel holes, an upper portion, a lower portion, a surge valve clamp and a surge valve bar, the lower portion being flared at an inclination to reduce fluid flow restriction;
a top mounting flange attached to the upper portion of the upper valve barrel, the top mounting flange includes an O-ring seal, a plurality of top flange holes arranged at a circumference of the top mounting flange, a clamp notch and a plurality of breakaway bolts, the plurality of top flange holes being adapted to connect with a plurality of matching holes of a fire hydrant which connects the dual plate backflow and breakaway check valve with the fire hydrant, the clamp notch holds the surge valve clamp in place when the fire hydrant being installed on the top mounting flange;
an upper plate assembly having a first upper front plate, a second upper front plate, a first upper back plate, a second upper back plate and an upper neoprene gasket having a plurality of upper witness stream holes, wherein the first upper front plate and the first upper back plate being connected together utilizing a plurality of fastening means to define a first upper plate arrangement and the second upper front plate and the second upper back plate being connected together utilizing the plurality of fastening means to define a second upper plate arrangement, the first upper plate arrangement and the second upper plate arrangement being attached to the upper neoprene gasket utilizing the plurality of fastening means, a first valve clamp limit bar and a second valve clamp limit bar to define a valve locking mechanism, the upper plate assembly being positioned inside the upper barrel assembly, wherein when the fire hydrant becomes damaged, the valve locking mechanism enables the plurality of upper witness stream holes to generate at least one plume of fluid to indicate location of damage and allows the upper barrel assembly to operate in a closure mode thereby generating a high pressure spray of fluid emitting from the upper valve barrel, whereby in the closure mode, the inclination of the lower portion of the upper valve barrel enables the plurality of upper witness stream holes to collide with an inner side wall of the upper valve barrel thereby dispersing the plurality of upper witness stream holes into a warning signaling mist;
a surge protection valve cap having a plurality of surge valve cap holes; and
an upper spring assembly having an upper spring member with a surge valve pin, a surge retainer bar with a plurality of upper retaining ends and an upper limit bar connected with the upper valve barrel by inserting and tightening a plurality of upper limit bar securing means through a plurality of upper limit bar holes, the upper spring member being connected with the surge retainer bar by inserting the surge valve pin through the plurality of upper retaining ends, the upper spring assembly being connected with the upper neoprene gasket and the surge protection valve cap, the upper spring assembly being positioned inside the upper valve barrel; and
a lower backflow protection valve assembly comprising:
a lower plate assembly having a first lower front plate, a second lower front plate, a first lower back plate, a second lower back plate and a lower neoprene gasket having a plurality of lower witness stream holes, wherein the first lower front plate and the first lower back plate being connected together utilizing the plurality of fastening means to define a first backflow lower plate arrangement and the second lower front plate and the second lower back plate being connected together utilizing the plurality of fastening means to define a second backflow lower plate arrangement, the first backflow lower plate arrangement and the second backflow lower plate arrangement being attached to the lower neoprene gasket, the lower plate assembly being positioned inside the upper barrel assembly;
a backflow protection valve cap having a plurality of backflow valve cap holes; and
a lower spring assembly having a lower spring member with a backflow valve pin, a backflow retainer bar with a plurality of lower retaining ends and a lower limit bar connected with the upper valve barrel by inserting and tightening a plurality of lower limit bar securing means through a plurality of lower limit bar holes, the lower spring member being connected with the backflow retainer bar by inserting the backflow valve pin through the plurality of lower retaining ends, the lower spring arrangement being connected with the lower neoprene gasket and the backflow protection valve cap, the lower spring assembly being positioned inside the upper valve barrel;
whereby when the fire hydrant gets damaged, the plurality of breakaway bolts breaks which causes the surge valve clamp and the surge valve bar to move away from the upper surge protection valve assembly thereby allowing the first upper front plate, the second upper front plate, the first upper back plate and the second upper back plate to rotate about the surge valve pin and closes the upper barrel assembly against the inner side wall of the upper valve barrel at the inclination and disperses the plurality of upper witness stream holes into the warning signaling mist.

12. The dual plate backflow and breakaway check valve of claim 11 wherein the upper spring assembly is connected with the upper neoprene gasket and the surge protection valve cap by inserting and tightening each of the plurality of fastening means through at least one of the plurality of witness stream holes and at least one of the plurality of surge valve cap holes.

13. The dual plate backflow and breakaway check valve of claim 11 wherein the upper spring assembly is positioned inside the upper barrel assembly by inserting and tightening each a plurality of surge valve cap screws through at least one of the plurality of surge valve cap holes and at least one of the plurality of upper barrel holes.

14. The dual plate backflow and breakaway check valve of claim 11 wherein the lower spring assembly being connected with the lower neoprene gasket and the backflow protection valve cap by inserting and tightening the plurality of fastening means through the plurality of witness stream holes and the plurality of backflow valve cap holes.

15. The dual plate backflow and breakaway check valve of claim 11 wherein the lower spring assembly is positioned inside the lower barrel assembly by inserting and tightening each of a plurality of backflow valve cap screws through at least one of the plurality of backflow valve cap holes and at least one of a plurality of lower barrel holes.

16. A dual plate backflow and breakaway check valve comprising:
an upper surge protection valve assembly comprising:
an upper barrel assembly having an upper valve barrel with a plurality of upper barrel holes, an upper portion, a lower portion, a surge valve clamp and a surge valve bar, the lower portion being flared at an inclination to reduce fluid flow restriction;
a top mounting flange attached to the upper portion of the upper valve barrel, the top mounting flange includes an O-ring seal, a plurality of top flange holes arranged at a circumference of the top mounting flange, a clamp notch and a plurality of breakaway bolts, the plurality of top flange holes being adapted to connect with a plurality of matching holes of a fire hydrant which connects the dual plate backflow and breakaway check valve with the fire hydrant, the clamp notch holds the surge valve clamp in place when the fire hydrant being installed on the top mounting flange;
an upper plate assembly having a first upper front plate, a second upper front plate, a first upper back plate, a second upper back plate and an upper neoprene gasket having a plurality of upper witness stream holes, wherein the first upper front plate and the first upper back plate being connected together utilizing a plurality of fastening means to define a first upper plate arrangement and the second upper front plate and the second upper back plate being connected together utilizing the plurality of fastening means to define a second upper plate arrangement, the first upper plate arrangement and the second upper plate arrangement being attached to the upper neoprene gasket utilizing the plurality of fastening means, a first valve clamp limit bar and a second valve clamp limit bar to define a valve locking mechanism, the upper plate assembly being positioned inside the upper barrel assembly, wherein when the fire hydrant becomes damaged, the valve locking mechanism enables the plurality of upper witness stream holes to generate at least one plume of fluid to indicate location of damage and allows the upper barrel assembly to operate in a closure mode thereby generating a high pressure spray of fluid emitting from the upper valve barrel, whereby in the closure mode, the inclination of the lower portion of the upper valve barrel enables the plurality of upper witness stream holes to collide with an inner side wall of the upper valve barrel thereby dispersing the plurality of upper witness stream holes into a warning signaling mist;
a surge protection valve cap having a plurality of surge valve cap holes; and
an upper spring assembly having an upper spring member with a surge valve pin, a surge retainer bar with a plurality of upper retaining ends and an upper limit bar connected with the upper valve barrel by inserting and tightening a plurality of upper limit bar securing means through a plurality of upper limit bar holes, the upper spring member being connected with the surge retainer bar by inserting the surge valve pin through the plurality of upper retaining ends, the upper spring assembly being connected with the upper neoprene gasket and the surge protection valve cap by inserting and tightening each of the plurality of the fastening means through at least one of the plurality of witness stream holes and at least one of the plurality of surge valve cap holes, the upper spring assembly being positioned inside the upper valve barrel by inserting and tightening each of the plurality of surge valve cap screws through at least one of the plurality of surge valve cap holes and the at least one of the plurality of upper barrel holes; and
a lower backflow protection valve assembly comprising:
a lower plate assembly having a first lower front plate, a second lower front plate, a first lower back plate, a second lower back plate and a lower neoprene gasket having a plurality of lower witness stream holes, wherein the first lower front plate and the first lower back plate being connected together utilizing the plurality of fastening means to define a first backflow lower plate arrangement and the second lower front plate and the second lower back plate being connected together utilizing the plurality of fastening means to define a second backflow lower plate arrangement, the first backflow lower plate arrangement and the second backflow lower plate arrangement being attached to the lower neoprene gasket, the lower plate assembly being positioned inside the upper valve barrel;

a backflow protection valve cap having a plurality of backflow valve cap holes; and a lower spring assembly having a lower spring member with a backflow valve pin, a backflow retainer bar with a plurality of lower retaining ends and a lower limit bar connected with the upper valve barrel by inserting and tightening a plurality of lower limit bar securing means through a plurality of lower limit bar holes, the lower spring member being connected with the backflow retainer bar by inserting the backflow valve pin through the plurality of lower retaining ends, the lower spring assembly being connected with the lower neoprene gasket and the backflow protection valve cap by inserting and tightening each of the plurality of fastening means through at least one of the plurality of witness stream holes and at least one of the plurality of backflow valve cap holes, the lower spring assembly being positioned inside the upper barrel assembly by inserting and tightening each of a plurality of backflow valve cap screws through at least one of the plurality of backflow valve cap holes and at least one of a plurality of lower barrel holes;

whereby when the fire hydrant gets damaged, the plurality of breakaway bolts breaks which causes the surge valve clamp and the surge valve bar to move away from the upper surge protection valve assembly thereby allowing the first upper front plate, the second upper front plate, the first upper back plate and the second upper back plate to rotate about the surge valve pin and closes the upper barrel assembly against the inner side wall of the upper valve barrel at the inclination and disperses the plurality of upper witness stream holes into the warning signaling mist.

17. The dual plate backflow and breakaway check valve of claim 16 wherein the lower spring assembly prevents backflow of fluid and possible fluid contamination.

* * * * *